US006130399A

United States Patent [19]

Lu et al.

[11] Patent Number: 6,130,399

[45] Date of Patent: Oct. 10, 2000

[54] ELECTRODE FOR A PLASMA ARC TORCH HAVING AN IMPROVED INSERT CONFIGURATION

[75] Inventors: Zhipeng Lu; Richard W. Couch, both of Hanover, N.H.

[73] Assignee: Hypertherm, Inc., Hanover, N.H.

[21] Appl. No.: 09/119,163

[22] Filed: Jul. 20, 1998

[51] Int. Cl.[7] .................................................... B23K 10/00

[52] U.S. Cl. ............................... 219/121.59; 219/121.52; 219/121.48; 219/75; 219/119

[58] Field of Search ......................... 219/121.39, 121.59, 219/121.48, 121.52, 121.49, 119, 74, 75

[56] References Cited

U.S. PATENT DOCUMENTS

| | | | |
|---|---|---|---|
| 3,148,263 | 9/1964 | Jensen | 219/75 |
| 3,242,305 | 3/1966 | Kane et al. | 219/75 |
| 3,592,994 | 7/1971 | Ford | 219/119 |
| 3,676,639 | 7/1972 | Esiban et al. | 219/121 R |
| 3,930,139 | 12/1975 | Bykhovsky et al. | 219/145 |
| 4,521,666 | 6/1985 | Severance, Jr. et al. | 217/121 PY |
| 4,558,201 | 12/1985 | Hatch | 219/121 PM |
| 4,567,346 | 1/1986 | Marhic | 219/121 PB |
| 4,625,094 | 11/1986 | Marhic et al. | 219/121 PM |
| 4,688,722 | 8/1987 | Dellassio et al. | 239/81 |
| 4,701,590 | 10/1987 | Hatch | 219/121 PR |
| 4,748,312 | 5/1988 | Hatch et al. | 219/121 PR |
| 4,766,349 | 8/1988 | Johansson et al. | 313/631 |
| 4,967,055 | 10/1990 | Raney et al. | 219/121.5 |
| 5,013,885 | 5/1991 | Carkhuff et al. | 219/121.5 |
| 5,023,425 | 6/1991 | Severance, Jr. | 219/121.59 |
| 5,070,227 | 12/1991 | Luo et al. | 219/121.55 |
| 5,097,111 | 3/1992 | Severance, Jr. | 219/121.52 |
| 5,105,061 | 4/1992 | Blankenship | 219/121.52 |
| 5,170,033 | 12/1992 | Couch, Jr. et al. | 219/121.51 |
| 5,216,221 | 6/1993 | Carkhuff | 219/121.51 |
| 5,310,988 | 5/1994 | Couch, Jr. et al. | 219/121.52 |
| 5,396,043 | 3/1995 | Couch, Jr. et al. | 219/121.5 |
| 5,464,962 | 11/1995 | Luo et al. | 219/121.52 |
| 5,601,734 | 2/1997 | Luo et al. | 219/121.52 |
| 5,767,478 | 6/1998 | Walters | 219/121.52 |
| 6,066,827 | 5/1900 | Nemchinsky | 219/121.52 |

FOREIGN PATENT DOCUMENTS

| | | |
|---|---|---|
| 0 144 267 A3 | 12/1985 | European Pat. Off. . |
| 0 314 791 A1 | 10/1989 | European Pat. Off. . |
| 0 465 109 A2 | 1/1992 | European Pat. Off. . |
| 0 476 572 A2 | 3/1992 | European Pat. Off. . |
| 40 18 423 | 12/1991 | Germany . |
| 1234-104 | 5/1986 | U.S.S.R. . |

*Primary Examiner*—Mark Paschall
*Attorney, Agent, or Firm*—Testa Hurwitz & Thibeault, LLP

[57] ABSTRACT

An electrode for use in a plasma arc torch has an insert designed to improve the service life of the electrode, particularly for high current processes. The electrode comprises an elongated electrode body formed of a high thermal conductivity material and having a bore disposed in a bottom end of the electrode body. The bore can be cylindrical or ring-shaped. An insert comprising a high thermionic emissivity material, and in some embodiments, a high thermal conductivity material, is disposed in the bore. The insert can be ringed-shaped or cylindrical.

38 Claims, 3 Drawing Sheets

ELECTRODE FOR A PLASMA ARC TORCH HAVING AN IMPROVED INSERT CONFIGURATION

FIELD OF THE INVENTION

The invention relates generally to the field of plasma arc torches and systems. In particular, the invention relates to an electrode for use in a plasma arc torch having an improved insert configuration.

BACKGROUND OF THE INVENTION

Plasma arc torches are widely used in the processing (e.g., cutting and marking) of metallic materials. A plasma arch torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is a constricted ionized jet of a plasma gas with high temperature and high momentum. The gas can be non-reactive, e.g. nitrogen or argon, or reactive, e.g. oxygen or air.

In process of plasma arc cutting or marking a metallic workpiece, a pilot arc is first generated between the electrode (cathode) and the nozzle (anode). The pilot arc ionizes gas passing through the nozzle exit orifice. After the ionized gas reduces the electrical resistance between the electrode and the workpiece, the arc then transfers from the nozzle to the workpiece. The torch is operated in this transferred plasma arc mode, characterized by the conductive flow of ionized gas from the electrode to the workpiece, for the cutting or marking the workpiece.

In a plasma arc torch using a reactive plasma gas, it is common to use a copper electrode with an insert of high thermionic emissivity material. The insert is press fit into the bottom end of the electrode so that an end face of the insert, which defines an emission surface, is exposed. The insert is typically made of either hafnium or zirconium and is cylindrically shaped.

While electrodes with traditional cylindrical inserts operate as intended, manufacturers continuously strive to improve the service life of such electrodes, particularly for high current processes. It is therefore a principal object of the present invention to provide an electrode having an insert configuration that improves the service life of the electrode.

SUMMARY OF THE INVENTION

A principal discovery of the present invention is the recognition that certain inherent limitations exist in the traditional cylindrical insert design. These limitations serve to limit the service life of the electrode, particularly for high current processes. For a traditional cylindrical insert, the size of the emitting surface is increased for higher current capacity operations. The high thermionic emissivity insert, however, has a poor thermal conductivity relative to the electrode body (e.g., hafnium has a thermal conductivity which is about 5% of the thermal conductivity of copper). This makes the removal of heat from the center of the insert to the surrounding electrode body, which serves as heat sink, difficult.

It is known to limit the diameter of the insert to a specified dimension, and this approach is successful up to a particular current level. When the torch operates at a current that exceeds that level, the centerline temperature of the insert exceeds the boiling point of the insert material, causing rapid loss of the insert material.

The present invention features an electrode having an insert designed to facilitates the removal of heat from the insert resulting in an improved service life of the electrode. In one aspect, the invention features an electrode for a plasma arc torch. The electrode comprises an elongated electrode body formed of a high thermal conductivity material. The material can be copper, silver, gold, platinum, or any other high thermal conductivity material with a high melting and boiling point and which is chemically inert in a reactive environment. A bore is disposed in a bottom end of the electrode body. The bore can be cylindrical or ringed-shaped. A ring-shaped insert, comprising a high thermionic emissivity material (e.g., hafnium or zirconium), is disposed in the bore. In one embodiment, the insert also comprises the high thermal conductivity material.

In one embodiment, the insert comprises a closed end which defines an exposed emission surface. In another embodiment, the insert comprises a first ring-shaped member formed of the high thermionic emissivity material and a second cylindrical member formed of high thermal conductivity material disposed in the first ring-shaped member. In yet another embodiment, the insert comprises a first ring-shaped member comprising the high thermionic emissivity material disposed in a second ring-shaped member formed of high thermal conductivity material. In another embodiment, the insert comprises a rolled pair of adjacent layers, the first layer comprising the high thermal conductivity material and the second layer comprising the high thermionic emissivity material.

In another aspect, the invention features an electrode for a plasma arc torch comprising an elongated body and an insert. The elongated body has a bore formed in an end face. The insert is disposed in the bore and comprises a high thermal conductivity material and a high thermionic emissivity material.

In one embodiment, the insert comprises a rolled pair of adjacent layers, the first layer comprising the high thermal conductivity material and a second layer comprising the high thermionic emissivity material. The first layer can be in the form of hafnium plating and the second layer can be a copper foil. In another embodiment, the electrode body has a ring-shaped bore, and the insert is ring-shaped. The insert can further comprise a closed end which defines an exposed emission surface.

In another embodiment, the insert comprises a cylindrically-shaped, high thermal conductivity material. The material has a plurality of parallel bores disposed in a spaced arrangement An element, comprising high thermionic emissivity material, is being disposed in each of the plurality of bores.

In still another aspect, the invention features a method of manufacturing an electrode for a plasma arc torch. A bore is formed at a bottom end of the elongated electrode body, which is formed of a high thermal conductivity material, relative to a central axis through the electrode body. The bore can be cylindrical or ring-shaped. An insert comprising a high thermionic emissivity material is inserted into the bore. The insert can be cylindrical or ring-shaped and can also comprise high thermal conductivity material.

In one embodiment, the insert is ringed-shaped and can have one closed end which defines an exposed emission surface. In another embodiment, the insert is formed from a first ring-shaped member comprising high thermionic emissivity material and a second cylindrical member comprising high thermal conductivity material disposed in the ring-shaped first insert.

The insert can be disposed a cylindrical bore formed in the electrode body having an inner bore and a deeper outer bore, such that the first member fits in the outer bore and the second member fits in the inner bore. Alternatively, the insert can be disposed in a cylindrical bore formed in the electrode body having an outer bore and a deeper inner bore, such that the first member fits in the outer bore and the second member fits in the inner bore.

In another embodiment, the insert is formed by sintering a composite powder mixture of a high thermal conductivity material and a high thermionic emissivity material. For example, the composite powder mixture comprises grains of the thermal conductivity material coated with the high thermionic emissivity material. In another embodiment, the insert is formed of a cylindrically-shaped, high thermal conductivity material. The material has a plurality of parallel bores disposed in a spaced arrangement An element, comprising high thermionic emissivity material, is being disposed in each of the plurality of bores.

In another embodiment, the insert is formed by placing a first layer comprising the high thermal conductivity material adjacent a second layer comprising the high thermionic emissivity material and rolling the adjacent layers.

An electrode incorporating the principles of the present invention offers significant advantages of existing electrodes. One advantage of the invention is that double arcing due to the deposition of high thermionic emissivity material on the nozzle is minimized by the improved insert. As such, nozzle life and cut quality are improved. Another advantage is that the service life is improved especially for higher current operations (e.g., >200A).

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being place on illustrating the principles of the present invention.

DETAILED DESCRIPTION

Figure 1:
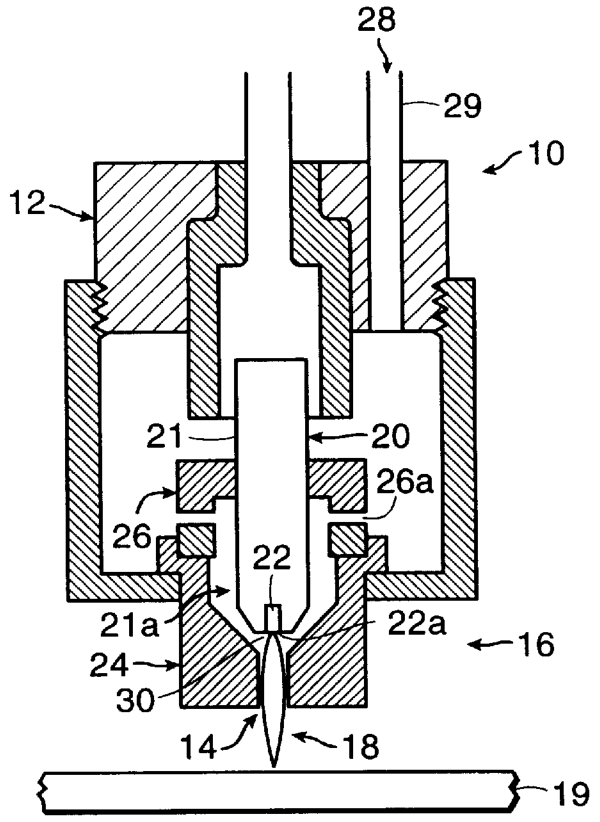
FIG. 1 is a cross-sectional view of a conventional plasma arc cutting torch.

FIG. 1 illustrates in simplified schematic form a typical plasma arc cutting torch 10 representative of any of a variety of models of torches sold by Hypertherm, Inc. in Hanover, N.H. The torch has a body 12 which is typically cylindrical with an exit orifice 14 at a lower end 16. A plasma arc 18, i.e. an ionized gas jet, passes through the exit orifice and attaches to a workpiece 19 being cut. The torch is designed to pierce and cut metal, particularly mild steel, the torch operates with a reactive gas, such as oxygen or air, as the plasma gas to form the transferred plasma arc 18.

The torch body 12 supports a copper electrode 20 having a generally cylindrical body 21. A hafnium insert 22 is press fit into the lower end 21*a* of the electrode so that a planar emission surface 22*a* is exposed. The torch body also supports a nozzle 24 which spaced from the electrode. The nozzle has a central orifice that defines the exit orifice 14. A swirl ring 26 mounted to the torch body has a set of radially offset (or canted) gas distribution holes 26*a* that impart a tangential velocity component to the plasma gas flow causing it to swirl. This swirl creates a vortex that constricts the arc and stabilizes the position of the arc on the insert.

In operation, the plasma gas 28 flows through the gas inlet tube 29 and the gas distribution holes in the swirl ring. From there, it flows into the plasma chamber 30 and out of the torch through the nozzle orifice. A pilot arc is first generated between the electrode and the nozzle. The pilot arc ionizes the gas passing through the nozzle orifice. The arc then transfers from the nozzle to the workpiece for the cutting the workpiece. It is noted that the particular construction details of the torch body, including the arrangement of components, directing of gas and cooling fluid flows, and providing electrical connections can take a wide variety of forms.

For conventional electrode designs, the diameter of the insert is specified for a particular operating current level of the torch. However, when the torch operates at a current that exceeds that level, the centerline temperature of the insert exceeds the boiling point of the insert material, causing rapid loss of the insert material.

Figure 2:
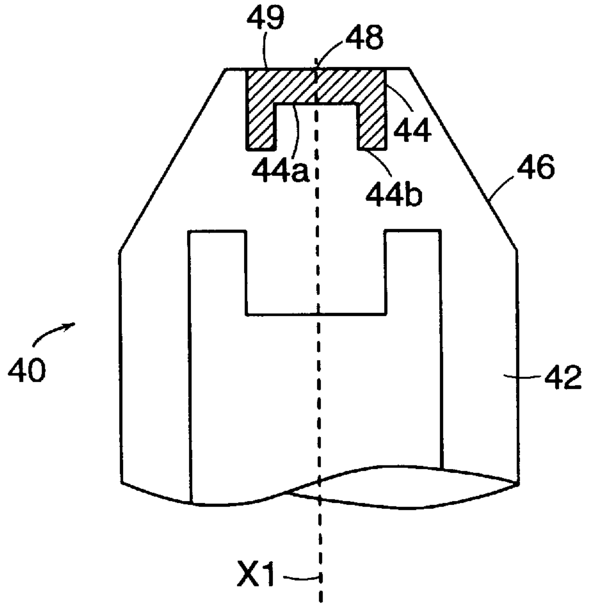
FIG. 2 is a partial cross-sectional view of an electrode having an insert configuration incorporating the principles of the present invention.

Referring to FIG. 2, a partial cross-sectional view of an electrode having an insert designed to facilitate the removal of heat from the insert resulting in an improved electrode service life is shown. The electrode 40 comprises a cylindrical electrode body 42 formed of a high thermal conductivity material. The material can be copper, silver, gold, platinum, or any other high thermal conductivity material with a high melting and boiling point and which is chemically inert in a reactive environment. A bore 44 is drilled in a tapered bottom end 46 of the electrode body along a central axis (X1) extending longitudinally through the body. As shown, the bore 44 is U-shaped (i.e., characterized by a central portion 44*a* having a shallower depth than a ringed-shaped portion 44*b*). An insert 48 comprising high thermionic emissivity material (e.g., hafnium or zirconium) is press fit in the bore. The insert 48 is ring-shaped and includes a closed end which defines an emission surface 49. The emission surface 49 is exposable to plasma gas in the torch body.

Figure 3:
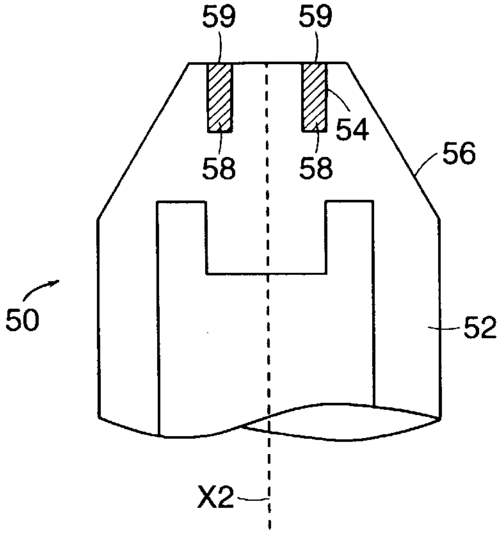
FIG. 3 is a partial cross-sectional view of an electrode having another insert configuration.

FIG. 3 is a partial cross-sectional view of an electrode having another insert configuration. The electrode 50 comprises a cylindrical electrode body 52 formed of high thermal conductivity material. A ring-shaped bore 54 is drilled in the bottom end 56 of the electrode body relative to the central axis (X2) extending longitudinally through the body. The bore 54 can be formed using a hollow mill or end mill drilling process. A ring-shaped insert 58 comprising high thermionic emissivity material is press fit in the bore. The insert 58 includes an end face which defines the emission surface 59.

Figure 4:
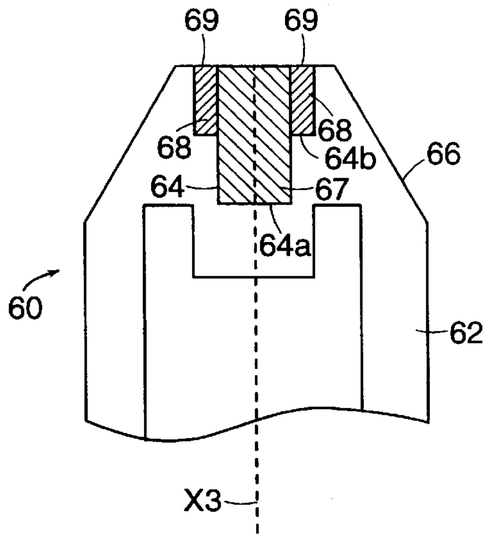
FIG. 4 is a partial cross-sectional view of an electrode having another insert configuration.

Referring to FIG. 4, a partial cross-sectional view of an electrode having another insert configuration is shown. The electrode 60 comprises a cylindrical electrode body 62 formed of high thermal conductivity material. A bore 64 is drilled in a tapered bottom end 66 of the electrode body along a central axis (X3) extending longitudinally through the body. As shown, the bore 64 is two-tiered (i.e., characterized by a central portion 64*a* having a deeper depth than a ringed-shaped portion 64*b*). A ring-shaped insert 68 comprising high thermionic emissivity material is press fit in the bore. The insert 68 includes an end face which defines the emission surface 69. A cylindrical insert 67, comprising high thermal conductivity material, is press fit into the central portion 64*a* of the bore 64 adjacent the insert 68.

Figure 5:
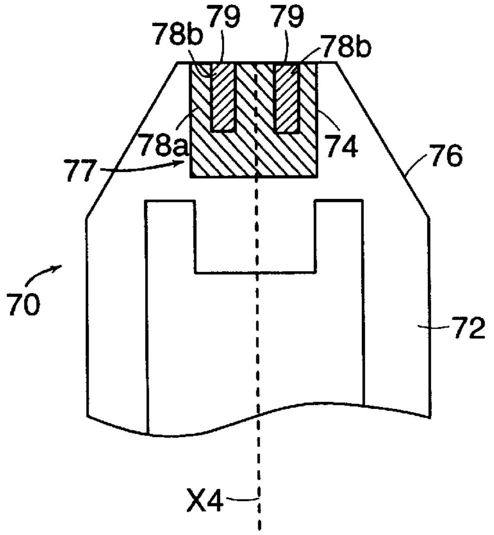
FIG. 5 is a partial cross-sectional view of an electrode having another insert configuration.

FIG. 5 is a partial cross-sectional view of an electrode having another insert configuration. The electrode 70 comprises a cylindrical electrode body 72 formed of high thermal conductivity material. A cylindrical bore 74 is drilled in a tapered bottom end 76 of the electrode body along a central axis (X4) extending longitudinally through the body. A cylindrical insert 77, comprising high thermal conductivity material portion 78*a* and a ring-shaped high thermionic emissivity material portion 78*b*, is press fit into the bore 74. The ring-shaped portion 78*b* includes an end face which defines the emission surface 79.

Figure 6:
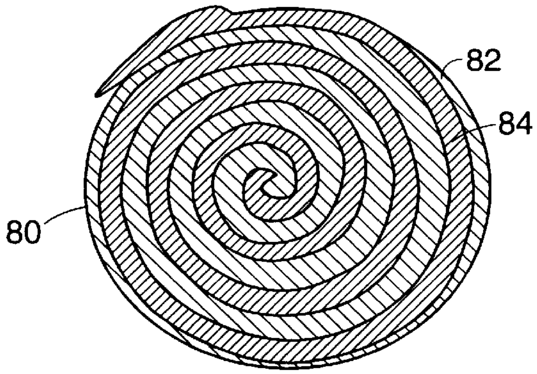
FIG. 6 is a cross-sectional view of another insert configuration for use in an electrode.

Referring to FIG. 6, a cross-sectional view of another insert configuration incorporating the principles of the present invention is shown. The insert 80 is a composite structure comprising adjacent layers of high thermal conductivity material and high thermionic emissivity material. More specifically, a layer 82 of high thermal conductivity material is placed on a layer 84 of high thermionic emissivity material. The two layers are rolled up to form a "jelly roll" structure. In one embodiment, the layer of high thermal conductivity material is a copper foil. The foil is plated with a layer of high thermionic emissivity material such as hafnium. The composite structure is rolled to form a cylindrical insert.

Figure 7:
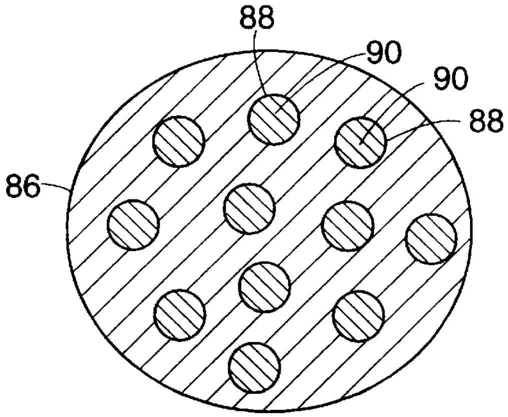
FIG. 7 is a cross-sectional view of another insert configuration for use in an electrode.

FIG. 7 is a cross-sectional view of another insert configuration. The insert 86 is a composite structure comprising both high thermal conductivity material and high thermionic emissivity material. The insert includes a cylindrical member 86 formed of high thermal conductivity material. A plurality of parallel bores 88 disposed in a spaced arrangement are formed in the member 86. An element 90, comprising high thermionic emissivity material, is disposed in each of the plurality of bores 88.

Figure 8:
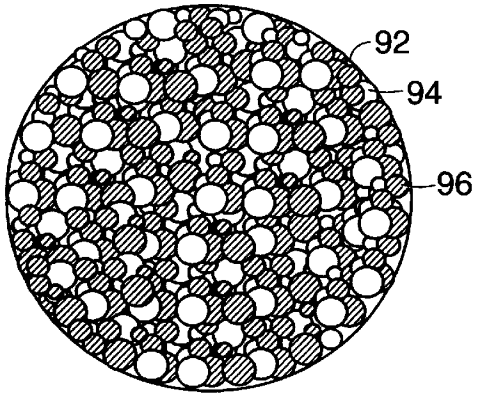
FIG. 8 is a cross-sectional view of another insert configuration for use in an electrode.

Referring to FIG. 8, a cross-sectional view of another insert configuration is shown. The insert 92 is formed by sintering a composite powder mixture of a high thermal conductivity material and a high thermionic emissivity material. The result is a composite material including grains of high thermal conductivity material 94 and grains of high thermionic emissivity material 96.

Figure 9:
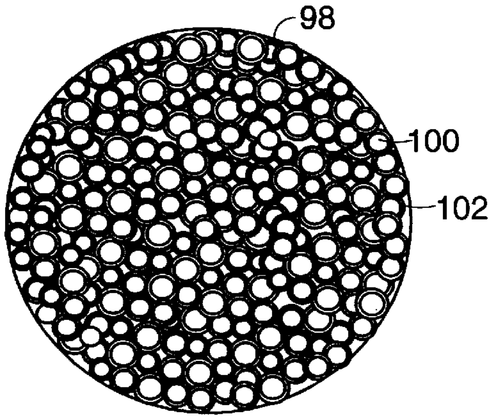
FIG. 9 is a cross-sectional view of another insert configuration for use in an electrode.

FIG. 9 a cross-sectional view of another insert configuration for an electrode. The insert 98 is formed of composite powder mixture comprising grains 100 of the thermal conductivity material coated with the high thermionic emissivity material 102.

The dimensions of the inserts 48, 58, 68, 78, 80, 86, 92 and 98 are determined as a function of the operating current level of the torch, the diameter (A) of the cylindrical insert and the plasma gas flow pattern in the torch.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims. For example, although the steps for manufacturing the electrode are described in a particular sequence, it is noted that their order can be changed. In addition, while the various inserts described herein are characterized as ringed-shaped, cylindrical and the like, such inserts can be substantially ringed-shaped, cylindrical and the like.

What is claimed is:

1. An electrode for a plasma arc torch, the electrode comprising:

an elongated electrode body formed of a high thermal conductivity material and having a bore disposed in a bottom end of the electrode body; and a ring-shaped insert comprising a high thermionic emissivity material disposed in the bore, the high thermionic emissivity material comprising hafnium or zirconium.

2. The electrode of claim 1 wherein the bore is ring-shaped.

3. The electrode of claim 1 wherein the insert further comprises a closed end which defines an exposed emission surface.

4. The electrode of claim 1 wherein the insert comprises a first ring-shaped member formed of a high thermionic emissivity material and a second cylindrical member formed of a high thermal conductivity material disposed in the first ring-shaped member.

5. The electrode of claim 1 wherein the insert comprises a first ring-shaped member comprising a high thermionic emissivity material disposed in a ring-shaped bore of a second member formed of a high thermal conductivity material.

6. The electrode of claim 4 or 5 wherein the second insert comprises copper, silver, gold, or platinum.

7. The electrode of claim 1 wherein the insert comprises a rolled pair of adjacent layers, the first layer comprising the high thermal conductivity material and a second layer comprising the high thermionic emissivity material.

8. The electrode of claim 1 wherein the insert further comprises a high thermal conductivity material.

9. An electrode for a plasma arc torch, the electrode comprising:

an elongated electrode body formed of a high thermal conductivity material and having a bore disposed in a bottom end of the electrode body; and an insert disposed in the bore and comprising a composite structure comprising a high thermionic emissivity material dispersed within a high thermal conductivity material, the high thermionic emissivity material comprising hafnium or zirconium.

10. The electrode of claim 9 wherein the a high thermal conductivity material comprises copper, silver, gold, or platinum.

11. The electrode of claim 9 wherein the insert comprises a rolled pair of adjacent layers, the first layer comprising the high thermal conductivity material and a second layer comprising the high thermionic emissivity material.

12. The electrode of claim 11 wherein the first layer comprises hafnium plating and the second layer comprises a copper foil.

13. The electrode of claim 9 wherein the electrode body has a ring-shaped bore and the insert is ring-shaped.

14. The electrode of claim 13 wherein the insert further comprises a closed end which defines an exposed emission surface.

15. The electrode of claim 9 wherein the insert comprises:

a cylindrical high thermal conductivity material having a plurality of parallel bores disposed in a spaced arrangement; and a plurality of elements comprising the high thermionic emissivity material, each member being disposed in one of the plurality of bores.

16. A method of manufacturing an electrode for a plasma arc torch comprising:

a) providing an elongated electrode body formed of a high thermal conductivity material;

b) forming a bore at a bottom end of the elongated electrode body relative to a central axis through the electrode body; and c) inserting a ring-shaped insert comprising a high thermionic emissivity material in the bore, the high thermionic emissivity material comprising hafnium or zirconium.

17. The method of claim 16 wherein step b) comprises:

b1) forming a ring-shaped bore.

18. The method of claim 17 wherein step c) comprises:

c1) inserting in the bore an insert having one closed end which defines an exposed emission surface.

19. The method of claim 16 wherein step b) comprises:

b1) forming a cylindrical bore.

20. The method of claim 19 wherein step b) comprises:

b1) forming the insert from a first ring-shaped member comprising a high thermionic emissivity material and a second cylindrical member comprising a high thermal conductivity material disposed in the ring-shaped first insert.

21. The method of claim 20 wherein step b) comprises:

b1) forming a cylindrical bore having an inner bore and a deeper outer bore, such that the first member fits in the outer bore and the second member fits in the inner bore.

22. The method of claim 20 wherein step b) comprises:

b1) forming a cylindrical bore having an outer bore and a deeper inner bore, such that the first member fits in the outer bore and the second member fits in the inner bore.

23. The method of claim 16 wherein step c) further comprises:

c1) forming the insert from a composite powder mixture of a high thermal conductivity material and a high thermionic emissivity material.

24. The method of claim 23 wherein the composite powder mixture comprises grains of the thermal conductivity material coated with the high thermal conductivity material.

25. The method of claim 16 wherein step c) further comprises forming the insert by:

c1) forming a plurality of parallel bores disposed in a spaced arrangement within a cylindrical high thermal conductivity material; and c2) positioning each of a plurality of elements comprising the high thermionic emissivity material in a respective one of the plurality of bores.

26. The method of claim 16 wherein step c) further comprises forming the insert by:

c1) placing a first layer comprising the high thermal conductivity material adjacent a second layer comprising the high thermionic emissivity material; and c2) rolling the adjacent layers.

27. A method of manufacturing an electrode for a plasma arc cutting torch, comprising:

a) providing an elongated electrode body formed of a high thermal conductivity material;

b) forming a bore at a bottom end of the elongated electrode body relative to a central axis extending longitudinally through the electrode body;

c) forming an insert comprising a composite structure comprising a high thermionic emissivity material dispersed within a high thermal conductivity material, the high thermionic emissivity material comprising hafnium or zirconium; and d) inserting in the bore of the electrode body.

28. The method of claim 27 wherein step c) comprises:

c1) providing a first layer of high thermal conductivity material and disposed adjacent a second layer of high thermionic emissivity material; and c2) rolling the adjacent layers.

29. The method of claim 27 wherein step c) comprises the steps of:

c1) forming a composite powder comprising the high thermal conductivity material and the high thermionic emissivity material; and c2) sintering the powder to form the insert.

30. The method of claim 29 wherein step c1) comprises:

c11) coating grains of high thermionic emissivity material with the high thermal conductivity material.

31. The method of claim 26 wherein step c) comprises:

c1) forming a plurality of parallel bores disposed in a spaced arrangement within the high thermal conductivity material; and c2) positioning each of a plurality of elements comprising the high thermionic emissivity material in a respective one of the plurality of bores.

32. A plasma arc torch comprising:

a torch body;

a nozzle supported by the torch body, the nozzle having an exit orifice; and an electrode supported by the torch body in a spaced relationship from the nozzle, the electrode comprising an elongated electrode body formed of a high thermal conductivity material and having a bore disposed in a bottom end of the electrode body and a ring-shaped insert comprising a high thermionic emissivity material disposed in the bore.

33. The torch of claim 32 wherein the high thermionic emissivity material comprises hafnium or zirconium.

34. The torch of claim 32 wherein the insert comprises a first ring-shaped member formed of a high thermionic emissivity material and a second cylindrical member formed of a high thermal conductivity material disposed in the first ring-shaped member.

35. The torch of claim 32 wherein the insert comprises a first ring-shaped member comprising a high thermionic emissivity material disposed in a ring-shaped bore of a second member formed of a high thermal conductivity material.

36. The torch of claim 32 wherein the insert further comprises a high thermal conductivity material.

37. A plasma arc torch comprising:

a torch body;

a nozzle supported by the torch body, the nozzle having an exit orifice; and an electrode supported by the torch body in a spaced relationship from the nozzle, the electrode comprising an elongated electrode body formed of a high thermal conductivity material and having a bore disposed in a bottom end of the electrode body and an insert comprising a composite structure disposed in the bore, the composite structure comprising a high thermionic emissivity material dispersed within a high thermal conductivity material.

38. The torch of claim 37 wherein the high thermionic emissivity material comprises hafnium or zirconium.

* * * * *

US006130399C1

(12) EX PARTE REEXAMINATION CERTIFICATE (6917th)

United States Patent

Lu et al.

(10) Number: US 6,130,399 C1

(45) Certificate Issued: Jul. 7, 2009

(54) ELECTRODE FOR A PLASMA ARC TORCH HAVING AN IMPROVED INSERT CONFIGURATION

(75) Inventors: Zhipeng Lu, Hanover, NH (US); Richard W. Couch, Hanover, NH (US)

(73) Assignee: Hypertherm, Inc., Hanover, NH (US)

Reexamination Request:
No. 90/010,129, Apr. 29, 2008

Reexamination Certificate for:

| | |
|---|---|
| Patent No.: | **6,130,399** |
| Issued: | **Oct. 10, 2000** |
| Appl. No.: | **09/119,163** |
| Filed: | **Jul. 20, 1998** |

(51) Int. Cl.
*B23K 10/00* (2006.01)

(52) U.S. Cl. .............................. 219/121.59; 219/121.52; 219/121.48; 219/75; 219/119

(58) Field of Classification Search ........................ None
See application file for complete search history.

(56) References Cited

U.S. PATENT DOCUMENTS

| | | | | |
|---|---|---|---|---|
| 3,148,263 | A | 9/1964 | Jensen | 219/75 |
| 3,198,932 | A | 8/1965 | Weatherly | 219/145 |
| 3,242,305 | A | 3/1966 | Kane et al. | 219/75 |
| 3,592,994 | A | 7/1971 | Ford | 219/119 |
| 3,676,639 | A | 7/1972 | Esiban et al. | 219/121 R |
| 3,930,139 | A | 12/1975 | Bykhovsky et al. | 219/45 |
| 4,521,666 | A | 6/1985 | Severance, Jr. et al. | 217/121 PY |
| 4,558,201 | A | 12/1985 | Hatch | 219/121 PM |
| 4,567,346 | A | 1/1986 | Marhic | 219/121 PB |
| 4,625,094 | A | 11/1986 | Marhic et al. | 219/121 PM |
| 4,688,722 | A | 8/1987 | Dellassio et al. | 239/81 |
| 4,701,590 | A | 10/1987 | Hatch | 219/121 PR |
| 4,748,312 | A | 5/1988 | Hatch et al. | 219/121 PR |
| 4,766,349 | A | 8/1988 | Johansson et al. | 313/631 |
| 4,967,055 | A | 10/1990 | Raney et al. | 219/121.5 |
| 5,013,885 | A | 5/1991 | Carkhuff et al. | 219/121.5 |
| 5,023,425 | A | 6/1991 | Severance, Jr. | 219/121.59 |
| 5,070,227 | A | 12/1991 | Luo et al. | 219/121.55 |
| 5,097,111 | A | 3/1992 | Severance, Jr. | 219/121.52 |
| 5,105,061 | A | 4/1992 | Blankenship | 219/121.52 |
| 5,170,033 | A | 12/1992 | Couch, Jr. et al. | 219/121.51 |
| 5,216,221 | A | 6/1993 | Carkhuff | 219/121.51 |
| 5,310,988 | A | 5/1994 | Couch, Jr. et al. | 219/121.52 |
| 5,396,043 | A | 3/1995 | Couch, Jr. et al. | 219/121.5 |
| 5,451,739 | A | 9/1995 | Nemchinsky et al. | 219/121.51 |
| 5,464,962 | A | 11/1995 | Luo et al. | 219/121.52 |
| 5,601,734 | A | 2/1997 | Luo et al. | 219/121.52 |
| 5,767,478 | A | 6/1998 | Walters | 219/121.52 |
| 6,066,827 | A | 5/2000 | Nemchinsky | 219/121.52 |

FOREIGN PATENT DOCUMENTS

| | | |
|---|---|---|
| DE | 40 18 423 | 12/1991 |
| EP | 0 144 267 A3 | 7/1985 |
| EP | 0 314 791 A1 | 5/1989 |
| EP | 0 465 109 A2 | 1/1992 |
| EP | 0 476 572 A2 | 3/1992 |
| JP | H10-15882 | 6/1998 |
| SU | 1234-104 A | 5/1986 |

*Primary Examiner*—Joseph A. Kaufman
(74) *Attorney, Agent, or Firm*—Proskauer Rose, LLP

(57) ABSTRACT

An electrode for use in a plasma arc torch has an insert designed to improve the service life of the electrode, particularly for high current processes. The electrode comprises an elongated electrode body formed of a high thermal conductivity material and having a bore disposed in a bottom end of the electrode body. The bore can be cylindrical or ring-shaped. An insert comprising a high thermionic emissivity material, and in some embodiments, a high thermal conductivity material, is disposed in the bore. The insert can be ringed-shaped or cylindrical.

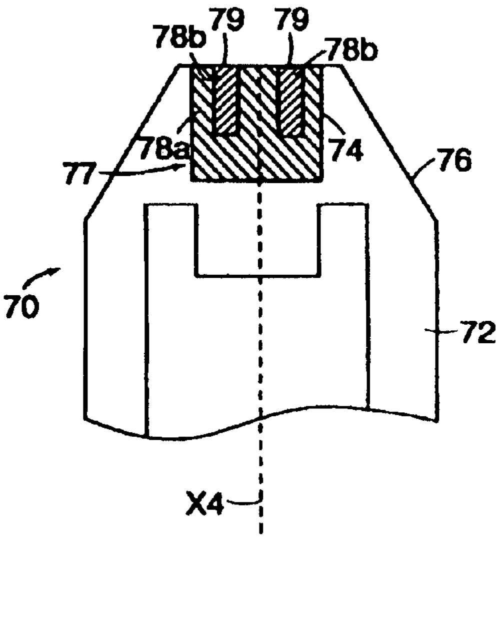

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 9, 16, 18, 27, 32 and 37 are determined to be patentable as amended.

Claims 2–8, 10–15, 17, 19–26, 28–31, 33–36 and 38, dependent on an amended claim, are determined to be patentable.

1. An electrode for a plasma arc torch, the electrode comprising:

an elongated electrode body formed of a high thermal conductivity material and having a bore disposed in a bottom end of the electrode body; and a ring-shaped insert comprising a high thermionic emissivity material [disposed in] *press fit in* the bore, the high thermionic emissivity material comprising hafnium or zirconium.

9. An electrode for a plasma arc torch, the electrode comprising:

an elongated electrode body formed of a high thermal conductivity material and having a bore disposed in a bottom end of the electrode body; and an insert [disposed in] *press fit in* the bore and comprising a composite structure comprising a high thermionic emissivity material dispersed within a high thermal conductivity material, the high thermionic emissivity material comprising hafnium or zirconium.

16. A method of manufacturing an electrode for a plasma arc torch comprising:

a) providing an elongated electrode body formed of a high thermal conductivity material;

b) forming a bore at a bottom end of the elongated electrode body relative to a central axis through the electrode body; and c) [inserting] *press fitting* a ring-shaped insert comprising a high thermionic emissivity material in the bore, the high thermionic emissivity material comprising hafnium or zirconium.

18. The method of claim 17 wherein step c) comprises:

c1) [inserting] *press fitting* in the bore an insert having one closed end which defines an exposed emission surface.

27. A method of manufacturing an electrode for a plasma arc cutting torch, comprising:

a) providing an elongated electrode body formed of a high thermal conductivity material;

b) forming a bore at a bottom end of the elongated electrode body relative to a central axis extending longitudinally through the electrode body;

c) forming an insert comprising a composite structure comprising a high thermionic emissivity material disposed within a high thermal conductivity material, the high thermionic emissivity material comprising hafnium or zirconium; and d) [inserting in] *press fitting the insert into* the bore of the electrode body.

32. A plasma arc torch comprising:

a torch body;

a nozzle supported by the torch body, the nozzle having an exit orifice; and an electrode supported by the torch body in a spaced relationship from the nozzle, the electrode comprising an elongated electrode body formed of a high thermal conductivity material and having a bore disposed in a bottom end of the electrode body and a ring-shaped insert comprising a high thermionic emissivity material [disposed in] *comprising hafnium or zirconium press fit in* the bore.

37. A plasma arc are torch comprising:

a torch body;

a nozzle supported by the torch body, the nozzle having an exit orifice; and an electrode supported by the torch body in a spaced relationship from the nozzle, the electrode comprising an elongated electrode body formed of a high thermal conductivity material and having a bore disposed in a bottom end of the electrode body and an insert comprising a composite structure [disposed] *press fit* in the bore, the composite structure comprising a high thermionic emissivity material dispersed within a high thermal conductivity material.

* * * * *